United States Patent Office 3,317,613
Patented May 2, 1967

3,317,613
PROCESS FOR CONTINUOUSLY PRODUCING METHYLAL
Gerhard Künstle and Fritz Knörr, Burghausen, Upper Bavaria, Germany, assignors to Wacker-Chemie G.m.b.H., Munich, Germany, a corporation of Germany
No Drawing. Filed Feb. 12, 1963, Ser. No. 257,830
Claims priority, application Germany, Feb. 21, 1962, W 31,715
2 Claims. (Cl. 260—615)

This invention relates to producing methylal, and it has for its object to provide a novel and improved process for this purpose.

Another object of the invention is to provide an economical process for the continuous quantitative conversion of formaldehyde into methylal.

Still another object is to provide a process of the type specified which may utilize aqueous formaldehyde solutions of very low concentration.

A further object is to provide a process of the foregoing type in which the catalyst can easily be separated from the reaction products and thus may be used almost indefinitely.

Various other objects and advantages will be apparent as the nature of the invention is more fully disclosed.

We have discovered a process for the continuous production of methylal by acetalizing aqueous mixtures of formaldehyde and methanol in the presence of acid catalysts, in which the formed methylal is removed continuously from the reaction mixture. The process is characterized by the fact that a cation exchanger is used and methanol is employed in the theoretically required quantity.

All highly acid cation exchangers can be used as catalysts in our process. Preferably those containing sulfonic acid groups and/or carboxyl groups are employed, these being described in Ullmann's Encyclopedia of Technical Chemistry, vol. 8 (1957), pages 787 to 816. For the transformation one can use the exchangers known under the trademarks "Lewatite," "Amberlite," "Wofatite," and "Dowex" on the basis of styrol-, phenolic-, acrylic acid- and vinyl resins with sulfonic acid- and/or carboxyl groups whose precise composition is generally not known.

The cation exchangers are arranged in the reaction chamber in such a manner that the incoming starting mixture flows toward the created methylal.

It is useful to use for the reaction zone a pipe in which the catalyst is arranged so as to leave spacing gaps or interstices. In this manner it is possible to remove the methylal product from the reaction equilibrium balance continuously in vapor form, through an evaporation column if necessary, and the escaping fluid can be withdrawn from the reaction zone continuously.

A particularly advantageous way of carrying out the process consists in feeding the fluid emerging from the reaction zone, either in part or all of it, into the reaction chamber above the input of the starting mixture. To increase the output one can pre-acetalize the starting mixture by means of a cation exchanger.

To carry out the process it is not necessary to use the commercially available concentrated (30–40 vol. percent) formaldehyde solutions. Aqueous formaldehyde solutions with a content of for instance 10% can also be used with success. Such solutions are obtained, for instance, during the oxidation of lower hydrocarbons like propane and butane with air, and heretofore it has been possible to process them only by using considerable excesses of methanol.

Also, aqueous methanol, if necessary in connection with low concentration aqueous formaldehyde solutions, can be used with good results.

The formation of acetal is a balance reaction demonstrated by the reaction equation $$CH_2O + 2CH_3OH \rightleftharpoons CH_2(OCH_3)_2 + H_2O$$

It was surprising that in spite of using additional quantities of water it is possible to obtain the same good results as when using aqueous formaldehyde solutions of higher concentration.

Moreover, it was surprising that when using cation exchangers as compared with using mineral acids as catalysts, the reaction takes place with greater yield, because it is known that many reactions that involve the separation of water and which run smoothly when mineral acids are used as catalysts, take place very slowly or not at all when the customary cation exchangers are used. Besides, the use of cation exchangers in the production of methylal has the advantage that the catalyst does not have a corroding influence on the metallic appartus employed.

Also remarkable is the ease with which the catalyst can be separated from the reaction products. The consequence is that once applied, the catalyst will practically not have to be renewed.

Also, the neutralization of larger quantities of acid reaction water becomes unnecessary.

*Example 1*

The apparatus used consists of a pre-reaction zone, a main reaction zone with jacket heating, and an elimination or discharge zone. The 50 cm. high pre-reaction zone with an inside diameter of 4.6 cm. is filled with a stationary bed of the cation exchanger Amberlite IR 120, the main reaction zone with a height of 300 cm. and inside diameter of 4.6 cm. is filled with 3.25 liters of the same cation exchanger, leaving gaps or interstices; and the discharge zone of 100 cm. height and inside diameter of 4.6 cm. is filled with Raschig rings of 4 mm. diameter.

After passing the unheated pre-reaction zone, a quantity of 1243 g. of the following input mixture is fed each hour into the main reaction zone above the cation exchange input: 21.44% formaldehyde, 49.19% methanol and 29.37% water, that is 8.83 mol formaldehyde and 19.11 mol methanol. The methanol input corresponds to the theoretical quantity which is necessary for the formation of the known methylal-methanol-azeotrope. The input mixture was made of an aqueous formaldehyde solution consisting of 36.7% formaldehyde, 13.6% methanol and 49.7% water, and by admixing the computed quantity of methanol. The main reaction zone is heated in such a way that the temperature is 90° C. at the lower end and 65° C. at the upper end. In the sump of the main reaction zone the temperature is held to about 100° C. At the upper end of the discharge zone at a recirculation proportion of 1:1 we obtained every hour 703.4 g. of a mixture free from formaldehyde, consisting of 94.0% methylal and 6.0% methanol. At the lower end of the main reaction zone water was withdrawn continuously, which contained practically no organic substances. During quantitative transformation of the formaldehyde the yield of methylal (computed at 100%) was 661.4 g. (8.71 mol), that is 98.5% in relation to the formaldehyde used.

Instead of the cation exchanger Amberlite IR 120 the following cation exchangers can be used with the same result: Amberlite IRC 50, Amberlite 200, Lewatite S 100, Permutite RS, Zerolite 225, Dowex 50, Wofatite KPS 200.

*Example 2 (comparative example)*

Here one works under the conditions of Example 1, but uses 2 weight percent of sulphuric acid as a catalyst, in relation to the mixture to be transformed, the cation exchange filler in the pre- and main reaction zones being replaced by Lunge-Berl saddles with the size of about 6 mm. The hourly input of 1200 g. transformation mixture consists of 254.3 g. (8.48 mol) formaldehyde, 576.5 g. (18.02 mol) methanol, 345.7 g. water and 23.5 g. sulphuric acid, corresponding to a composition of the catalyst-free mixture of 21.5% formaldehyde, 49.1% methanol and 29.4% water. The methanol input corresponds to the theoretical quantity which is necessary for the formation of the known methylal-methanol-azeotrope. The input mixture was made of an aqueous formaldehyde solution consisting of 36.7% formaldehyde, 13.6% methanol and 49.7% water, by admixing the computed quantity of methanol. There are obtained at the upper end of the discharge zone every hour 572.1 g. of a mixture of 93.0% methylal, 6.9% methanol and 0.1% formic acid methyl ester. At the lower end of the main reaction zone every hour there flows out 575.8 g. of a mixture consisting of 3.8% sulphuric acid, 5.4% methanol, 5.7% formaldehyde and 85.1% water. Thus only 87.1% of the applied formaldehyde is transformed. The yield of methanol- and water-containing methylal amounts to 94.8% referred to the formaldehyde consumed.

*Example 3*

The apparatus described in Example 1 was used. In the manner described in Example 1, every hour 1200 g. of a conversion mixture were fed into the main reaction zone, consisting of 22.21% formaldehyde, 47.36% methanol and 30.43% water, which is 8.88 mol formaldehyde and 17.76 mol methanol. The methanol input amounts to 100% of the quantity theoretically required for the quantitative transformation of the formaldehyde into 100% methylal. The input mixture was composed of an aqueous formaldehyde solution consisting of 36.7% formaldehyde, 13.6% methanol and 49.7% water, by admixing the computed quantity of methanol. Into the lower third of the discharge zone every hour were fed 266 g. of the fluid withdrawn from the lower end of the main reaction zone. At the upper end of the discharge zone there were obtained every hour 673 g. of a methanol-free methylal with a water content of 0.6% by weight. The sump output was practically free of methanol and formaldehyde. A complete transformation of the formaldehyde into methanol-free methylal took place. The yield of pure methylal was 668.1 g. (computed at 100%), that is 99.0% referred to the formaldehyde used.

*Example 4*

The apparatus described in Example 1 was used. In the manner described in said example, every hour 1200 g. of a conversion mixture were fed into the main reaction zone, consisting of 8.50% formaldehyde, 18.10% methanol and 73.40% water, that is 3.40 mol formaldehyde and 6.80 mol methanol. The input mixture was made of an aqueous formaldehyde solution consisting of 10.0% formaldehyde, 3.71% methanol and 86.29% water, by admixing the computed amount of pure methanol. The methanol input amounted to 100.0% of the quantity theoretically required for the quantitative transformation of the formaldehyde into methanol-free methylal. Into the lower third of the discharge zone every hour were fed 105 g. of the fluid withdrawn from the lower end of the main reaction zone. At the upper end of the discharge zone were obtained every hour 255.4 g. of a methanol- and formaldehyde-free methylal with a water content of 0.6 weight percent. The sump runoff was practically free of methanol and formaldehyde. A complete transformation of the formaldehyde into methanol-free methylal took place. The yield of pure methylal amounted to 253.9 g. (computed at 100%), i.e. 98.2% referred to the formaldehyde used.

*Example 5 (comparative example)*

The apparatus described in Examples 3 and 4 was used, but using 2 weight percent of sulphuric acid as catalyst, referred to the transformation mixture, the cation exchanger filling in the pre- and main reaction zones being replaced by Lunge-Berl saddles of about 6 mm. In the manner described in Example 2, every hour 1224 g. of a transformation mixture were fed into the main reaction zone consisting of 102 g. (3.40 mol) formaldehyde, 218 g. (6.80 mol) methanol, 880 g. water and 24 g. sulphuric acid, corresponding to a composition of the catalyst-free input mixture of 8.50% formaldehyde, 18.10% methanol and 73.40% water. The input mixture was made of an aqueous formaldehyde solution consisting of 10.0% formaldehyde, 3.71% methanol and 86.29% water, by admixing the computed quantity of pure methanol. Into the lower third of the discharge zone every hour were fed 110 g. of the fluid withdrawn from the lower end of the main reaction zone. At the upper end of the discharge zone one obtains every hour 181.7 g. of a mixture of 98.9% methylal, 0.2% methanol and 0.9% water. At the lower end of the main reaction zone there run off every hour 1022 g. of a mixture of 2.34% sulphuric acid, 5.75% methanol, 2.64% formaldehyde and 89.27% water. Thus only 73.5% of the formaldehyde applied is converted. The yield of methanol- and water-containing methylal is 94.5% referred to the formaldehyde consumed.

*Example 6*

The apparatus described in Example 1 was used. In the manner described in Example 1, every hour 1200 g. of a transformation mixture were fed into the main reaction zone, consisting of 8.50% formaldehyde, 18.10% methanol and 73.40% water, that is 3.40 mol formaldehyde and 6.80 mol methanol. The input mixture was obtained from an aqueous formaldehyde solution consisting of 20.0% formaldehyde, 8.10% methanol and 71.90% water, by admixing a 25.6% aqueous methanol solution. The methanol input amounted to 100.0% of the quantity theoretically required for the quantitative transformation of the formaldehyde into methanol-free methylal. Into the lower third of the discharge zone every hour were fed 110 g. of the fluid withdrawn from the lower end of the main reaction zone. At the upper end of the discharge zone were obtained every hour 254.5 g. of a methanol- and formaldehyde-free methylal with a water content of 0.6 weight percent. The sump runoff was practically free of methanol and formaldehyde. A complete transformation of the formaldehyde into methanol-free methylal took place. The yield of pure methylal was 253.0 g. (computed at 100%), that is 98.0% referred to the formaldehyde consumed.

*Example 7*

The apparatus consisted of a pre-reaction zone, a main reaction zone with jacket heating, and a discharge zone. The pre-reaction zone 60 cm. high and with an inside diameter of 27 cm. was filled with a stationary bed of the cation exchanger Amberlite IR 120; the main reaction zone 400 cm. high and with an inside diameter of 15 cm. was filled with 32.0 liters of the same cation exchanger leaving gaps; and the discharge zone 200 cm. high and with an inside diameter of 15 cm. was filled with Raschig rings of 15 mm. diameter.

After passing through the unheated pre-reaction zone, the amount of 30.0 kg. of the following input mixture was fed each hour into the main reaction zone above the cation exchange input: 22.21% formaldehyde, 47.36% methanol and 30.43% water, that is 221.0 mol formaldehyde and 442.0 mol methanol. The methanol input amounted to 100.0% of the quantity theoretically required for the quantitative transformation of the formaldehyde into 100% methylal. The input mixture was made of an aqueous formaldehyde solution, consisting of 36.7% formaldehyde, 13.60% methanol and 49.7% water, by admixing the computed quantity of methanol. The temperature at the lower end of the main reaction zone was held to about 100° C. Into the lower third of the discharge zone every hour were fed 6.65 kg. of the fluid withdrawn from the lower end of the main reaction zone. At the upper end of the discharge zone were obtained every hour 16.74 kg. of a formaldehyde- and methanol-free methylal with a water content of 0.6 weight percent. At the lower end of the main reaction column water was withdrawn continuously which practically no longer contained any organic parts. During quantitative transformation of the formaldehyde the yield of methanol-free methylal was 98.9% referred to the formaldehyde used.

The invention claimed is:

1. Process for continuously producing methylal which comprises preacetalizing an aqueous mixture of formaldehyde and methanol by passing same through a pre-reaction zone at room temperature in the presence of an acid cation exchanger, reacting the preacetalized mixture in the presence of an acid cation exchanger at a temperature of 65–90° C., continuously removing methylal in vapor form from the upper end of the reaction zone and continuously removing water from the bottom of the reaction zone, said process being characterized by the fact that stoichiometric quantities of the aqueous reaction mixture of formaldehyde and methanol flow into the reaction zone against the created methylal, and by the fact that said cation exchanger is arranged in such a way as to leave spacing gaps therein whereby to facilitate the removal of the created methylal.

2. Process according to claim 1, in which at least a part of the liquid reaction water removed from the bottom of said reaction zone is returned to said reaction zone above the point at which the starting mixture of formaldehyde and methanol enters said reaction zone.

References Cited by the Examiner

UNITED STATES PATENTS 2,566,559   9/1951   Dolnick et al. _____ 260—615

FOREIGN PATENTS 566,673   11/1958   Canada.

OTHER REFERENCES

Vinokurov, D. M.: Chemical Abstracts 53, 15959i (1959).

Vinokurov, D. M.: Chemical Abstracts 54, 7932b (1960).

LEON ZITVER, Primary Examiner.

B. HELFIN, H. T. MARS, Assistant Examiners.